(12) United States Patent
Wrinch

(10) Patent No.: US 11,795,816 B2
(45) Date of Patent: Oct. 24, 2023

(54) COMPRESSING ULTRASOUND DATA IN A DOWNHOLE TOOL

(71) Applicant: DarkVision Technologies Inc., British Columbia (CA)

(72) Inventor: Steve Wrinch, North Vancouver (CA)

(73) Assignee: DarkVision Technologies Inc., North Vancouver (CA)

( * ) Notice: Subject to any disclaimer, the term of this patent is extended or adjusted under 35 U.S.C. 154(b) by 735 days.

(21) Appl. No.: 16/817,215

(22) Filed: Mar. 12, 2020

(65) Prior Publication Data

US 2020/0291771 A1 Sep. 17, 2020

(30) Foreign Application Priority Data

Mar. 14, 2019 (GB) ...................................... 1903525

(51) Int. Cl.
*G01V 1/48* (2006.01)
*E21B 47/14* (2006.01)
*E21B 47/002* (2012.01)
*E21B 17/10* (2006.01)

(52) U.S. Cl.
CPC ............ *E21B 47/14* (2013.01); *E21B 47/002* (2020.05); *G01V 1/48* (2013.01); *E21B 17/1021* (2013.01); *G01V 2210/48* (2013.01)

(58) Field of Classification Search
CPC .... E21B 47/14; E21B 47/002; E21B 17/1021; G01V 1/48; G01V 2210/48
See application file for complete search history.

(56) References Cited

U.S. PATENT DOCUMENTS

| 5,684,693 | A | * | 11/1997 | Li | G01V 1/42 |
| | | | | | 702/6 |
| 8,428,378 | B2 | | 4/2013 | Mansour | |
| 8,666,132 | B2 | | 3/2014 | Takeshima | |
| 9,605,536 | B2 | | 3/2017 | Mickael | |
| 9,657,564 | B2 | | 5/2017 | Stolpman | |
| 9,866,835 | B2 | * | 1/2018 | Gelman | H04N 19/172 |
| 2017/0167247 | A1 | | 6/2017 | Gao et al. | |
| 2017/0205524 | A1 | | 7/2017 | Mandal et al. | |

(Continued)

FOREIGN PATENT DOCUMENTS

| CA | 2632916 A1 * | 5/2007 | ............. E21B 47/12 |
| CN | 106841402 A | 6/2017 | |
| EP | 2629089 B1 | 4/2019 | |

(Continued)

OTHER PUBLICATIONS

Combined Search and Examination Report for GB Application No. 1903525.2, dated Apr. 2, 2019, 6 pages.

*Primary Examiner* — Krystine E Breier

(57) ABSTRACT

A device and method to compress and store ultrasound data from an ultrasound logging device. The logging device is deployed in a well or pipe to be logged with one or more ultrasound transducers, preferably an array of transducers. On-board the device, are processors and memory units for convolving the ultrasound data with a wavelet transformation to generate wavelet coefficients and then compress the wavelet coefficients to generate compressed wavelet coefficients. The compressed wavelet coefficients are stored on the memory units and transferred to a remote computer once the device leaves the well or pipe.

22 Claims, 9 Drawing Sheets

(56) References Cited

U.S. PATENT DOCUMENTS

2017/0359478 A1* 12/2017 Deshpande ............... G06T 9/00
2018/0176499 A1* 6/2018 Gelman ............... H04N 19/136

FOREIGN PATENT DOCUMENTS

| KR | 200400099 Y1 | 11/2005 | | |
| WO | WO-0005599 A2 * | 2/2000 | ............. | G01V 1/247 |
| WO | WO-2009099333 A1 * | 8/2009 | ......... | E21B 47/0002 |

* cited by examiner

70 Deploy device in well and capture scan lines into an Image Frame. Determine compression parameters.

71 Determine Line Max Range per line then amplify all signals in that line.

72 Segment scan lines of a frame into a set of memory strips. For each scan line in the strip:

73 Apply Discrete Wavelet Transform using a Cascading Filter bank

75 For each Filter bank sub-band, determine dynamic threshold, then scale those based on sub-band importance

76 Set those coefficients below threshold to zero.

77 Quantize Thresholded coefficients.

78 Compress quantized coefficients for strip.

79 Create Header Packet of compression parameters and compressed coefficients for all sub-bands and all scan lines in frame. Send to Data Storage.

Fig. 5

COMPRESSING ULTRASOUND DATA IN A DOWNHOLE TOOL

FIELD OF THE INVENTION

The invention relates generally to an ultrasound device operating in a well or pipe and method of compressing ultrasound data.

BACKGROUND OF THE INVENTION

Inspection devices are often deployed in a wellbore to inspect the condition of the tubular/pipe or fluid flow within. For example, hydrocarbons in production casing may contaminate ground water if there are cracks or deformations in the casing. Ultrasound is a known way of imaging such structures to detect problems thus protecting the environment.

In some ultrasound inspection devices, such as that taught in CA2989439 an array of ultrasound transducers is disposed radially around the device. The transducers may be in a pitch-catch or pulse echo arrangement, in each case the data depends on the time for transmitted signals to be received.

In advanced devices, there may be hundreds of transducer elements, captured every second, sampled at many MHz, creating a huge amount of raw data. However, the data is preferably image processed and viewed by an operator at the surface, very far from the device. This leads to problems of telemetry bandwidth, on-device storage capabilities and real-time on-board processing.

Certain video compression techniques, such as H.264 or HEVC, are unsuitable because they are optimized for 2D unsigned images in the colour range, with most compression coming from inter-frame similarities. In ultrasound devices, the concern is reconstruction of high-frequency signed signal data while maintaining the amplitude and phasing information of the signal data. Other techniques such as Fourier Transform compress the large stream of time-series data into frequency components. However, the original data cannot be reconstructed from this as there is no way to know when the pulses of a given frequency occurred, and yet the timing of pulses is needed to determine the distance to the pipe or well.

Another approach is using audio compression but most codecs are either too slow, or are optimized for the frequencies that are typically picked up by the human ear.

The present invention aims to address these problems by compressing the data using a novel wavelet process.

SUMMARY OF THE INVENTION

In accordance with a first aspect of the invention there is provided a method of compressing ultrasound data received by a logging device having an ultrasound sensor. The method comprises: deploying the device into a well or pipe; receiving ultrasound data with the sensor; using a processor of the device, applying a forward wavelet transform to the ultrasound data to generate wavelet coefficients; using the processor of the device, applying a compression algorithm having a threshold algorithm to the wavelet coefficients then encoding the thresholded result to the wavelet coefficients to generate compressed wavelet coefficients; storing the compressed wavelet coefficients on a memory of the device; and transmitting the compressed wavelet coefficients to a remote computer after the device exits the well or pipe.

The compression algorithm may comprise quantizing the wavelet coefficients, preferably using μ-Law companding.

The encoding may be a lossless encoding algorithm based on LZ77, LZ78 and variants thereof, preferably one of: LZ1, LZ2, DEFLATE, LZ4, LZO, LZMA, Snappy, ZStandard, and Brotli.

The threshold algorithm may dynamical computes threshold values to apply.

The method may further comprises using the processor to calculate scale factors of the ultrasound data based on its dynamic range, scaling the ultrasound prior to applying the forward wavelet transform and storing the calculated scale factors on the memory.

The wavelet coefficients may correspond to frequency sub-bands in the range 200 KHz to 10 MHz.

The method may further comprise transferring the stored wavelet coefficients to a computer system remote from the device and decompressing the wavelet coefficients to reconstruct the ultrasound data.

The sensor may comprise a plurality of transducer elements.

The ultrasound data may comprise a plurality of scan lines in a data frame and wherein the processor operates on a set of scan lines in a contiguous memory strip.

The Wavelet Transform is a Haar Wavelet or Daubechies Wavelet.

In accordance with a second aspect of the invention there is provided a logging device comprising: a housing arranged to be deployed in a well or pipe; an ultrasound sensor for receiving ultrasound data; a processor; and one or more non-volatile memory units for storing compressed data and for storing instructions. The instructions are executable by the processor to: apply a forward wavelet transform to the ultrasound data to generate wavelet coefficients; apply a compression algorithm to the wavelet coefficients to generate compressed wavelet coefficients; and store the compressed wavelet.

Thus the method and device may compress high-bandwidth ultrasound data and store the compressed data on-device until the device emerges from the well or pipe.

BRIEF DESCRIPTION OF THE DRAWINGS

Various objects, features and advantages of the invention will be apparent from the following description of embodiments of the invention, as illustrated in the accompanying drawings. The drawings are not necessarily to scale, emphasis instead being placed upon illustrating the principles of various embodiments of the invention.

FIG. 5 is a workflow for compressing an acoustic waveform.

Similar Reference Numerals Indicate Similar Components Having the Following Key:

2 fluid-carrying structure, such as a well, pipe, borehole, tubing, or casing;

10 imaging device;
11 scan line;
12 acoustic array;
14 ultrasound driver;
15 device circuit;
16 body;
17 wireline;
18 operations site;
19 Remote computer;
20 centralizers;
33 Surface Telemetry Unit;
34 Device Telemetry Unit;
35 FPGA;
36 Data Memory (RAM);
37 Data storage (Non-volatile);
38 Processor;
39 Instruction Memory (non-volatile);
65 Pipeline;
66 Chunk Ring Buffer;
67 Chunk File Writer 14
80 Analogue Front End;
81 HV Pulser;
82 HV Mux/Demux;
83 HV Protection switch;
84 FPGA;
85 Analog Front End Chip;
86 Amplifiers (including DVGA, LNA, and Summing Amps);
87 B-Mode processor;
88 Rx beamforming; and
89 Tx beamforming.

DETAILED DESCRIPTION OF THE INVENTION

With reference to the figures, devices and methods are disclosed for receiving, compressing, and storing ultrasound data in a downhole device.

Figure 1:
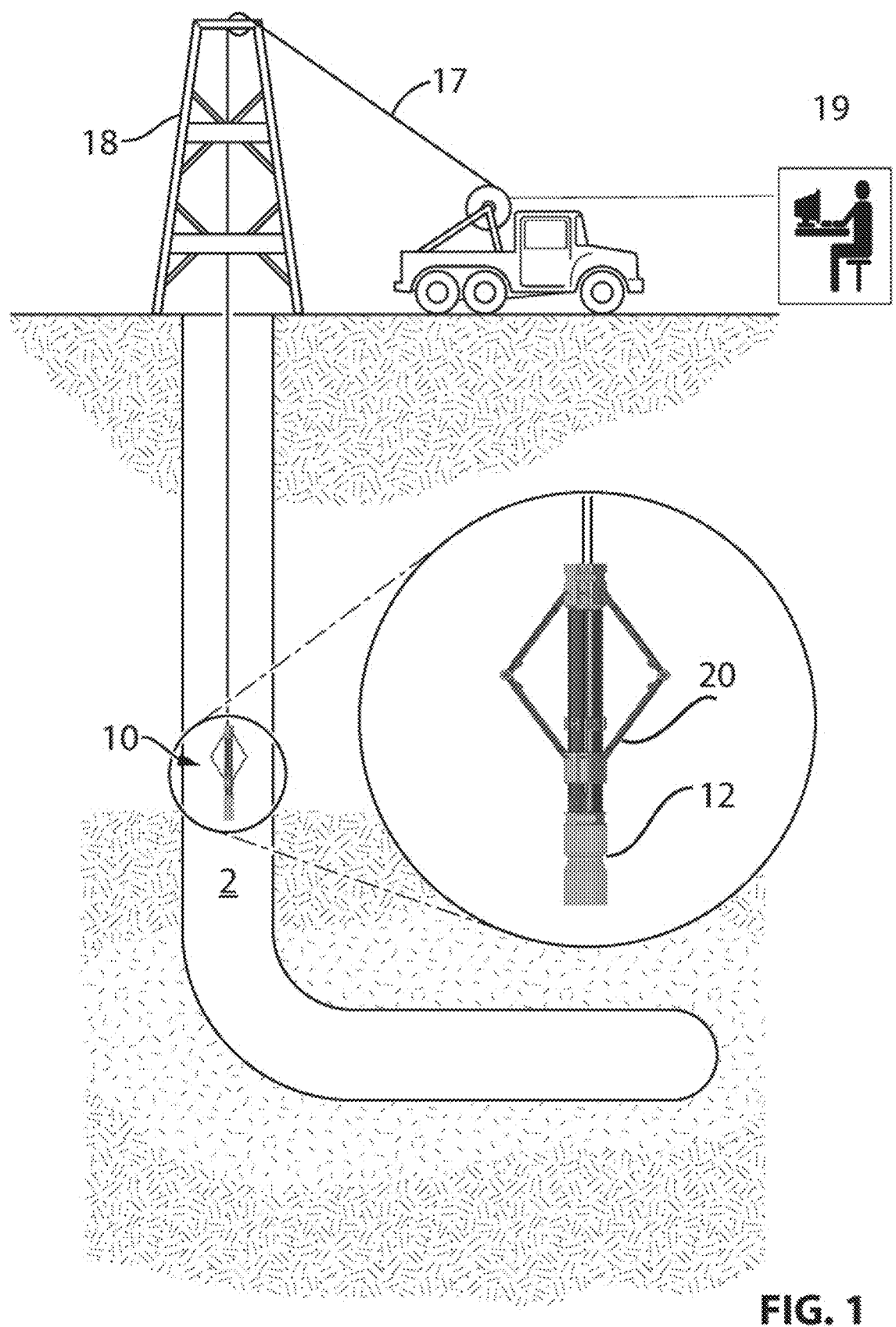
FIG. 1 is a cross-sectional view of an imaging device deployed in a wellbore in accordance with one embodiment of the invention.

As illustrated in FIG. 1 and there is provided an imaging device 10 for imaging a well or pipe 2. The imaging device 10 generally comprises an acoustic transducer sensor 12, a body 16, an ultrasound circuit 14, processor 15, and one or more centralizing elements 20. Acoustic transducers are desirable in fluid well inspection applications because they can work even in opaque fluids, can be beam steered to change the apparent direction of a wave-front, and can be beam focused to inspect different depths. Thus, the imaging device can acquire volumetric data of the well.

Figure 2:
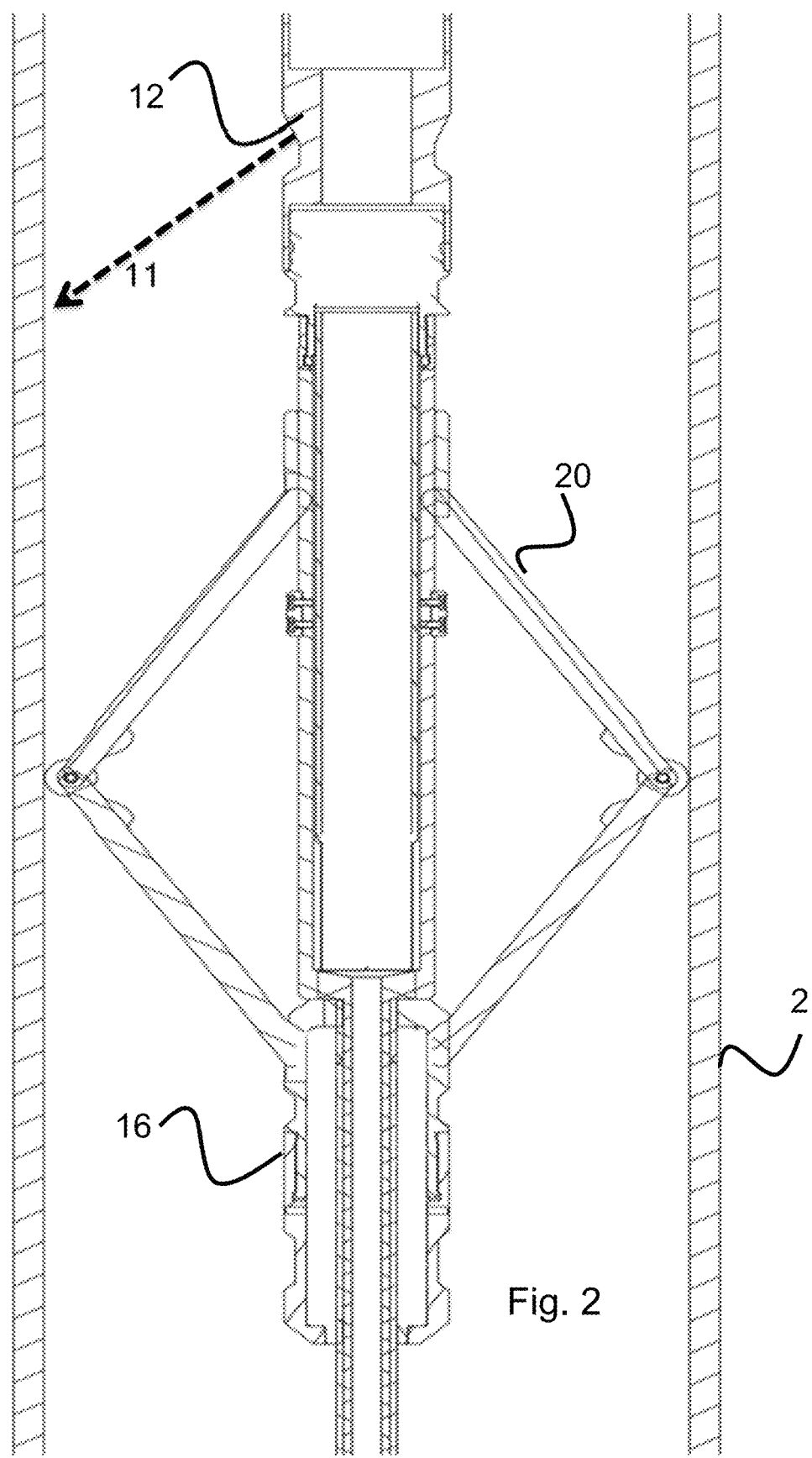
FIG. 2 is a cross-sectional view of an imaging device in a well.

The device may be that described in patent applications WO2016/201583A1 published 22 Dec. 2016 to Darkvision Technologies Ltd, incorporated herein in its entirety. Described therein is a device having an array of radially-distributed, outward-facing acoustic transducers (i.e. a radial array). The array 12 sonifies the well or pipe 2 with acoustic pulses 11 emitted radially or conically (see FIG. 2). Other applications for the present invention may include Cement Bond Logging, Logging-While-Drilling (LWD), and pigging operations.

Figure 3:
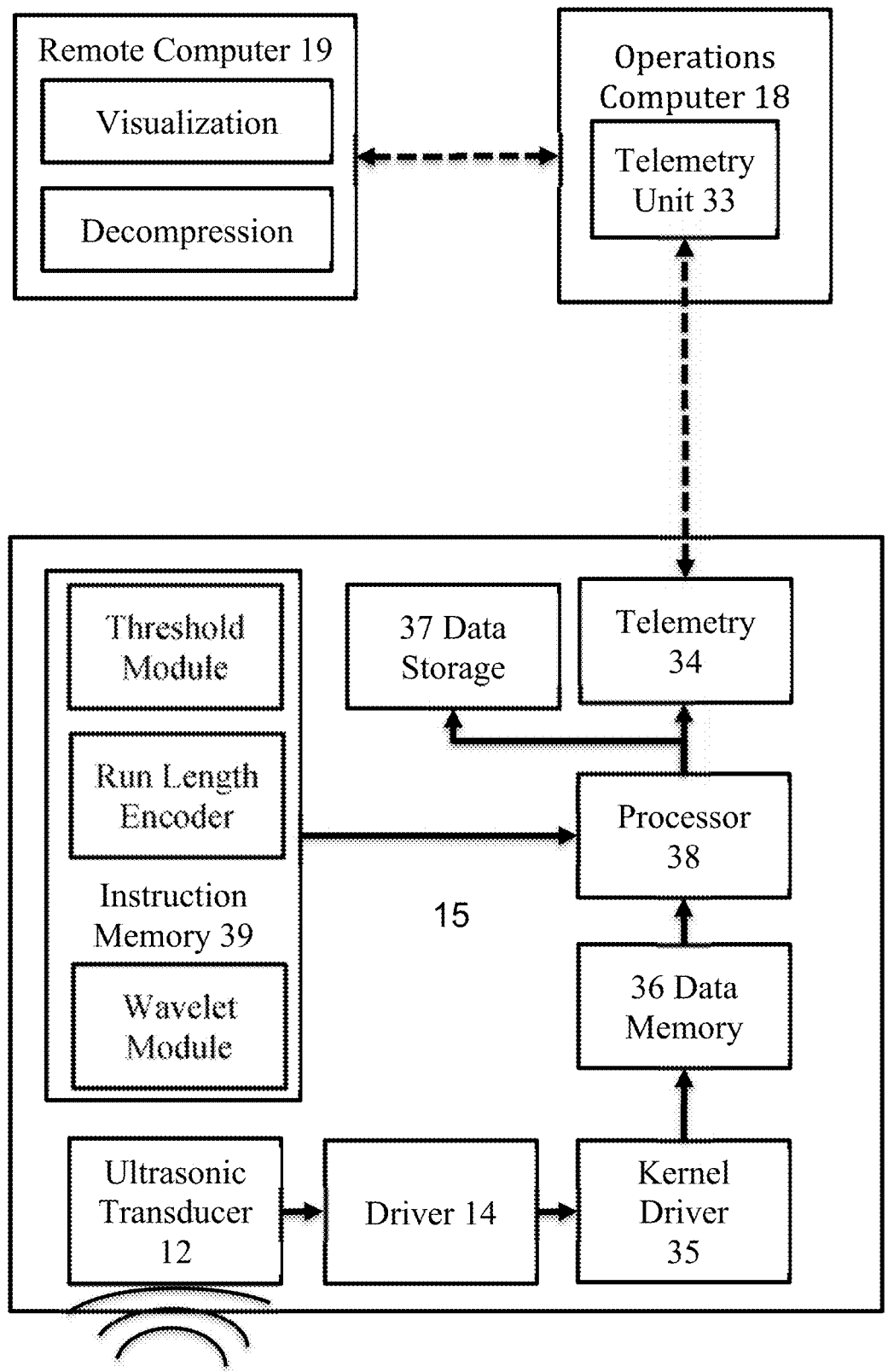
FIG. 3 is a block diagram of computers and software modules.

FIG. 3 is a block diagram of components of circuit 15 for controlling the device and processing the ultrasound data for storage and transmission. Driver circuit 14 outputs raw ultrasound data, which are put into Data Memory 36 via Kernel Driver 35. Processor 38 runs instructions from instruction memory 39 to compress the raw signal. Data storage 37 (e.g. SD Card) records the compressed signal that can later be uncompressed to analyze the ultrasound data and create a high-quality model of the wellbore. Processor 38 may also demodulate (e.g. Hilbert envelope, I/Q) the raw signal into a low-bandwidth signal to be transmitted to the surface over a telemetry network (units 34, 33) for real-time visualization of the logging operation. Arrows indicate data flow over data buses, which may be a shared or separate buses.

It will be appreciated that data processing may be performed with plural processors: on the device, at the operations site, and optionally on a remote computer. The term 'processor' is intended to include computer processors, cloud processors, microcontrollers, firmware, GPUs, FPGAs, and electrical circuits that manipulate analogue or digital signals. While it can be convenient to process data as described herein, using software on a general computer, many of the steps could be implemented with purpose-built circuits. In preferred embodiments of the present system, the device processing circuit 15 provides signal conditioning, data compression and data storage, while the operations 18/remote 19 processor provides data decompression and image processing.

It will be appreciated that the various memories discussed may be implemented as one or more memory units. Non-volatile memory is used to store the compressed data and instructions so that the device can function without continuous power. Volatile memory (RAM and cache) may be used to temporarily hold raw data and intermediate computations.
Transducers The transducer sensor may comprise a plurality of acoustic transducer elements, preferably operating in the ultrasound band, preferably arranged as an evenly spaced one-dimensional radial array. The frequency of the ultrasound waves generated by the transducer(s) is generally in the range of 200 kHz to 30 MHz, and may be dependent upon several factors, including the fluid types and velocities in the well or pipe and the speed at which the imaging device is moving. In most uses, the central carrier frequency of a scan line is 1 to 10 MHz, which provides reflection from micron features.

Although the center frequency may be set by the transducer design, there will be some off-center frequencies emitted in the well (broadband emission). There will be multiple reflections off the well walls, affecting the frequencies, and then received by the transducer as a reflection signal.

The transducer arrays may create hundreds of scan lines per frame, operating at a rate of tens of frames per second, each scan line sampled at several MHz, thus creating a huge stream of raw data (aka RF data). Thus there is a compression facility on the device to create and store a compressed signal, which compressed signal is stored until the device exits the well or pipe, so that the compressed signal may be streamed to the Operations site 18 or remote computer 19.

Figure 4:
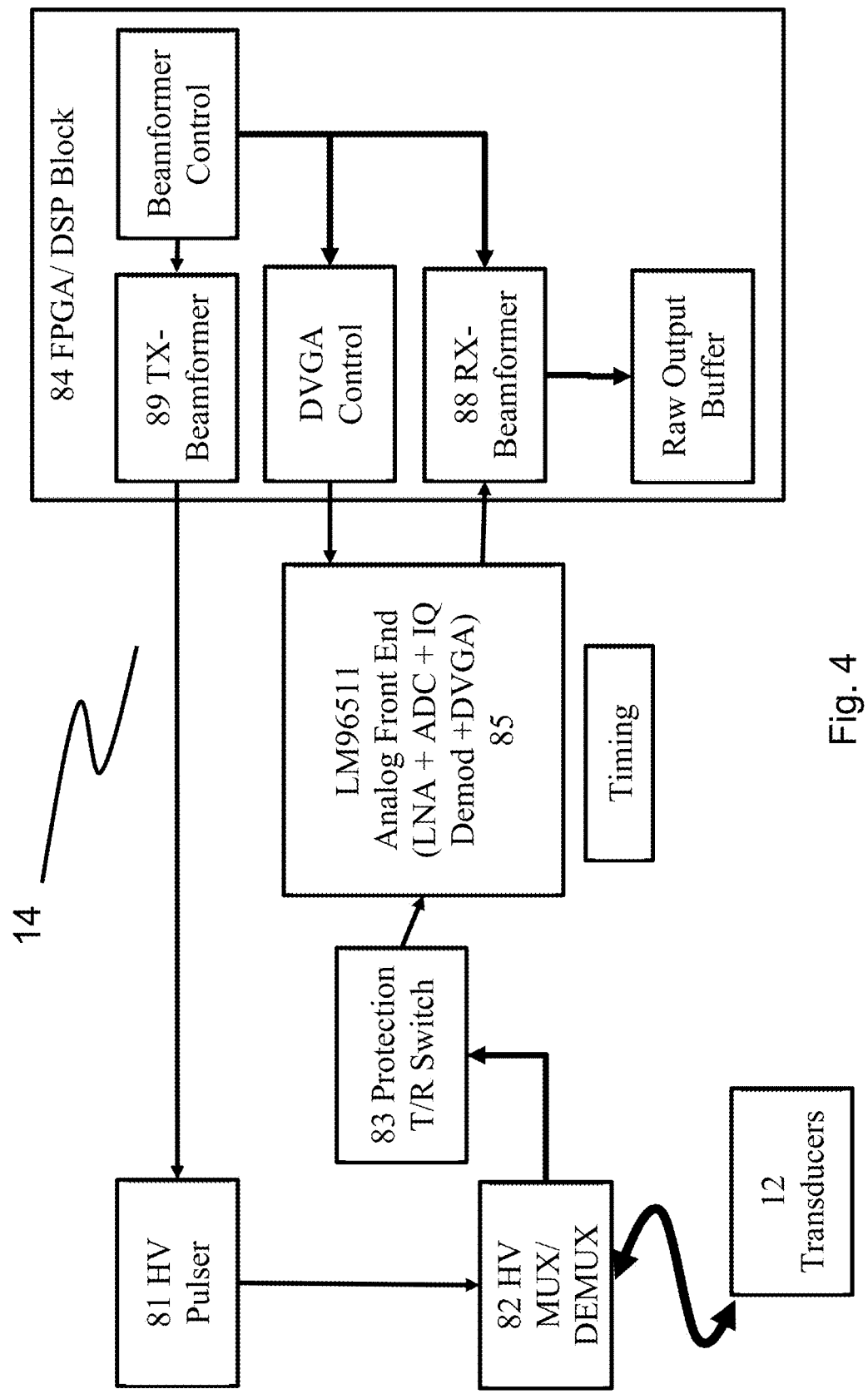
FIG. 4 is a circuit block diagram for driving ultrasound transducers.

Specialized Ultrasound circuits exist to drive and receive arrays of ultrasound transducers, such as LM96511 from Texas Instruments. FIG. 4 provides an example ultrasound circuit comprising an analog chip 85, FPGA block 84, MUX/DEMUX 82, High Voltage T/R switch 83, High Voltage Pulser 81, and timing chips. The FPGA is an efficient chip for integrating many logical operations. The block may comprise Tx beamforming 89 and Rx beamforming 88, DVGA control (Digitally controlled Variable Gain Amplifiers).

Without loss of generality, each of these components may comprise multiples of such chips, e.g. the memory may be multiple memory chips. For the sake of computing efficiency, several of the functions and operations described separately above may actually by combined and integrated within a chip. Conversely certain functions described above may be provided by multiple chips, operating in parallel. For example, the LM96511 chip operates eight transducers, so four LM96511 chips are used to operate an aperture of 32 transducers.

The computer processor accesses instructions stored in the memory. The instructions may control the operation of the device, its actuators, and high-level scanning steps, while the actual timing of transducers may be left to FPGA 84. The FPGA memory may store the sequence of lines, transducer addresses comprised in a given line, and the timing delays of the transducers in the aperture. The FPGA generates a set of timing signals as well as selection signals to control the MUX. The pulser receives the timing signals and generate one or more pulses of electrical energy to vibrate the piezoelectrical crystals at the drive frequency. The MUX selects the desired set of transducers in the scan line to receive the timed pulses. The HV switch 83 prevents the high voltage pulses from reaching the analog front end 80.

During the Receive window, the switch 83 connects the analog chip 80 to the same transducers selected by the MUX. The signals may be sampled at a higher frequency than the pulse frequency, preferably at least twice the pulse frequency. The same RX beamforming delays are applied to the received signals to offset the signals and sum them. Chip 85 converts the summed signal to the digital domain. The output is a stream of digital data for a single scan line.

Compression Process

The current device and method may employ plural compression algorithms, which algorithms reduce the total memory required to store the data. Quantization, for example, maps input data of a large range to an output of a smaller range. Encoding replaces repeat values and value patterns in the input with corresponding codes.

Each scan line in the image frame is compressed, as exemplified in FIG. 5, in real-time from data memory 36 to storage 37. The device is deployed into a well or pipe and the compression parameters are determined (step 70). Example parameters are: frequency sub-bands (250 kHz to 8 MHz), carrier frequency (4 MHz), sampling frequency (40 MHz), scan line count (256), samples per line (500), amplification factors, wavelet form (Haar), threshold levels, and desired compression level (5% of raw signal size). These compression parameters may be set based on the imaging mode, whereby choosing a higher compression level reduces accuracy of the reconstructed waveform.

Ultrasound reflections are captured by driver 14 for each scan line as RAW DATA, typically as a 16-bit signed integer. From the RAW DATA (step 71), the processor determines the maximum absolute signal value in each line (Line Max Range). This is used to increase the signal value to use the maximum dynamic range of the RAW DATA datatype, from a potentially small value to create a greater valued SCALED RAW DATA. An efficient method is to left-shift the RAW DATA integers by N bits, where N is equal to Log 2(FullRange)–Log 2(LineMaxRange). The value N for each scan line is stored for use during the decompression process to reverse the amplification (see step 98 in FIG. 7).

Step 72 is an optional but computationally efficient way to process plural scan lines together for each operation. Plural scan lines (e.g. a set of 16 or 32 scan lines) are segmented into a 'strip' of contiguous memory, whereby multiple strips are preferably split among multiple processors for parallel compression. Each strip can subsequently be wavelet transformed, quantized and compressed independently to improve the efficiency of the algorithm to encode data in real-time.

Figure 6:
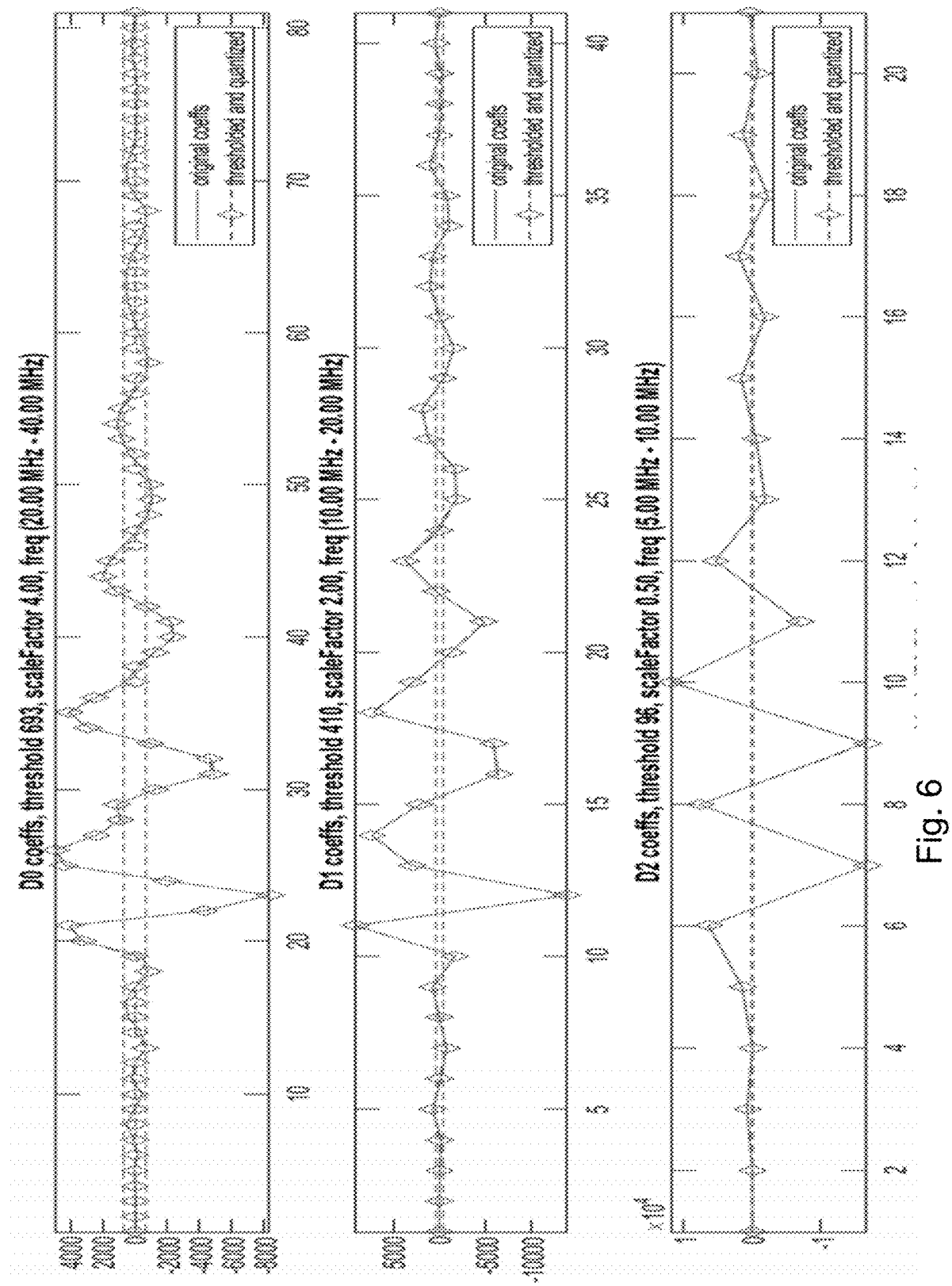
FIG. 6 is a set of graphs for compression coefficients.

The SCALED RAW DATA is filtered across plural frequency sub-bands by applying a Discrete Wavelet Transform using a cascading Filter bank to calculate a set of RAW WAVELET COEFFICIENTS and RESIDUAL APPROXIMATION (see Step 73 and FIG. 6).

Filter bank sub-bands are determined from the initial sampling frequency of the reflection and down sampling by a power of two down to the lower bound of frequencies that are of interest to the application. This determines the depth of the Filter bank. The frequency sub-bands which correspond to frequencies of most interest in the present application are frequencies in the range of 200 Khz to 10 Mhz, which are typically useful to capture well or pipe features.

The Wavelet function is preferably an orthogonal wavelet function, such as Haar, Daubechies, Morlet, or other wavelet that is compatible with a Discrete Wavelet Transform. Advantageously Haar is computationally efficient on integral data and can be computed without overflow or datatype transformation.

A threshold algorithm is applied to the RAW WAVELET COEFFICIENTS to generate THRESHOLDED WAVELET COEFFICIENTS. The threshold value may be a constant value but preferably the processor calculates a Dynamic Threshold Value for each set of sub-band coefficients. One approach is to calculate the statistical distribution of the coefficients per sub-band, per scan line and then set a threshold that would remove a certain fraction of them. For example, the threshold may be set to remove the weakest 10% of coefficients, assuming a normal distribution. The thresholding algorithm is consistent regardless of the original amplitude of the RAW DATA.

For each sub-band, an Importance Scalar may be assigned to focus the compression on frequencies considered important and to discard the frequencies that are considered unimportant. In preferred embodiments, sub-bands near the carrier frequency or reflective from features of a desired size are deemed important.

The Dynamic Threshold Value and Importance Scalars are combined to define a thresholding value for sub-band coefficients. The thresholds may be higher for frequencies of less interest, such that coefficients whose values are within the range of [–threshold, threshold] are set to zero. Higher thresholds increase the compression level but loses information about that sub-band. In FIG. 6 the combined threshold (dashed line) is highest for the 20-40 MHz sub-band, leading to the removal of most coefficients here.

The processor applies thresholding to the RAW WAVELET COEFFICIENTS, for each sub-band by replacing coefficients within the range of [–threshold, threshold] with zeros and creates a set of THRESHOLDED WAVELET COEFFICIENTS (step 76). These zero value coefficients become useful later for Encoding.

In Step 77, the processor quantizes the THRESHOLDED WAVELET COEFFICIENTS to create QUANTIZED WAVELET COEFFICIENTS, preferably using a modified µ-Law Companding algorithm which gives more dynamic range to smaller signal values. For example, the coefficients may be calculated as 16-bit integers values and fit by the algorithm to an 8-bit range for better compression.

(Step 78) The QUANTIZED WAVELET COEFFICIENTS are then compressed once more, using a lossless encoding algorithm based on LZ77, LZ78 and variants thereof, including algorithms such as: LZ1, LZ2, DEFLATE, LZ4, LZO, LZMA, Snappy, ZStandard, and Brotli. Such algorithms compress data by representing repeated values (e.g. Zero) and patterns of values more simply. Performing on a strip of plural scan lines enables the algorithm to find more efficient packing patterns. The choice of algorithm will be a trade-off of speed of compression vs resulting compression size.

The result is a set of COMPRESSED WAVELET COEFFICIENTS for each strip of plural scan lines. All plural strips representing an image frame are combined with the compression parameters into a data packet, which is then sent to the data storage system (step 79).

The foregoing compression is a preferred embodiment. The skilled person will appreciate that other steps may be added between these steps, certain steps may be omitted or combined with other steps, and that the order of certain steps may change. Individually identified software modules and hardware are notional only and may be implemented in various seamless ways.

Reducing data storage size (and thus data storage I/O bandwidth) is one optimization. The compression can require heavy processing which may make the on-tool processor the bottleneck. The compression process can be sped up by performing many of the steps in parallel threads on multiple processors. A further optimization is the arrangement of the memory from which data is read and written, such that the compression steps can operate smoothly over larger data sets in a processor cache-friendly manner. Finally, platform specific optimizations can be used to further improve the speed of the algorithm including the use of SIMD (Single Instruction Multiple Data) instructions that are features of modern processor architectures.

Figure 8:
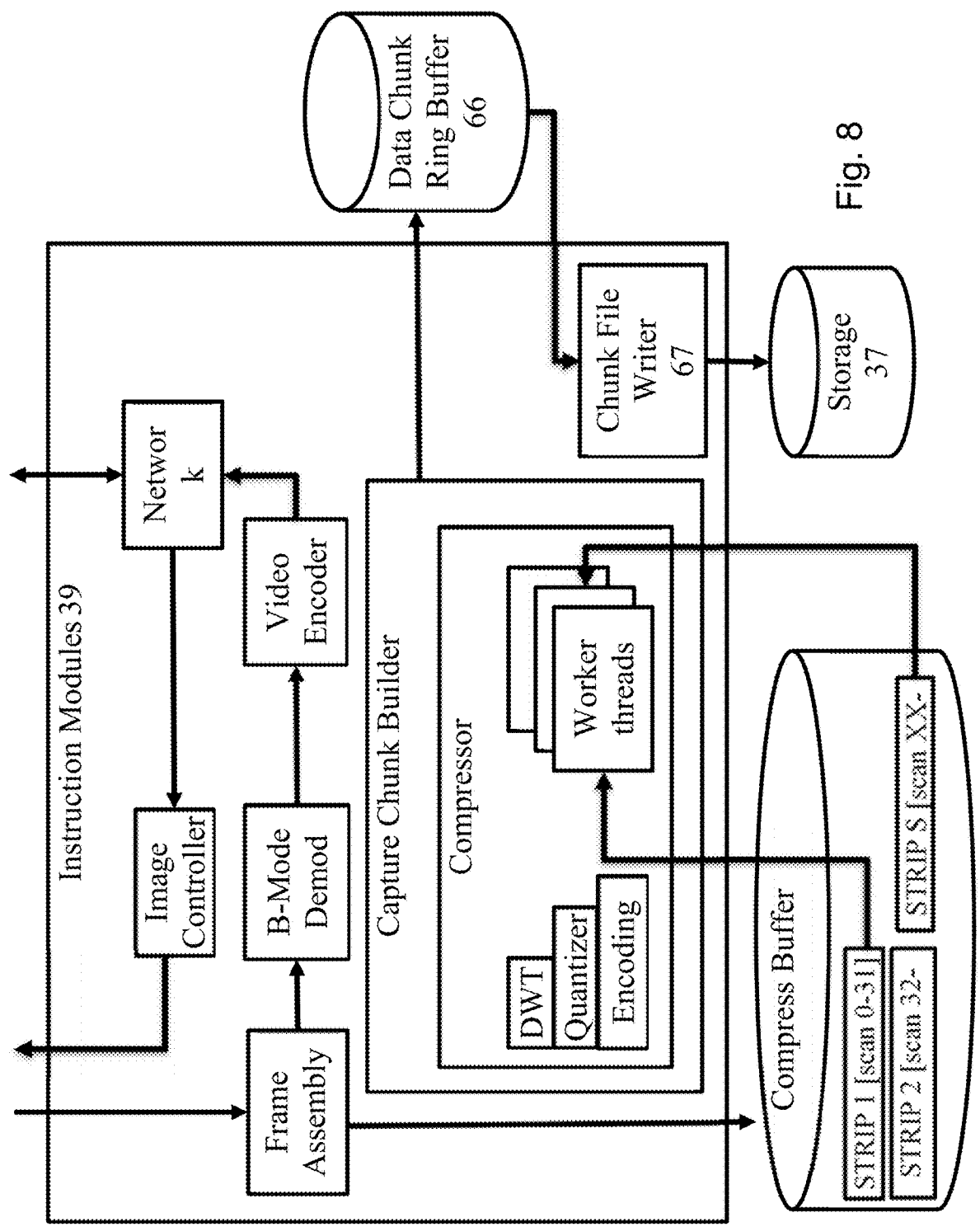
FIG. 8 is a diagram of data flow for compression.

FIG. 8 provides a block diagram of memory and instruction modules for highly efficient compression of the ultrasound data output by Circuit 14. The stream of raw data is assembled into a Frame of all the scan lines. Plural scan lines are then assigned a continuous strip of memory, here shown as Compress Buffer of Strips 1-S. Here each strip holds RAW DATA for 32 scan lines. Multiple threads run the compression instructions (DWT, Quantization, and Encoding), each thread operating on a strip. These threads are sent to separate processing cores for parallel processing. The contiguous memory allocations simplify and speed up data reading/writing, without worry about data access problems.

The chunks of compressed data (i.e. QUANTIZED WAVELET COEFFICIENTS) are written to ring buffer 66 as they are computed. Chunk File Writer 67 copies a block of this data to contiguous page of data storage 37.

Similarly, certain metadata of the packet (e.g. Line Max Range) are also compressed. The inventors have found that in the present application the metadata is often constant (i.e. constant diameter pipe, similar signal levels, consistent fluid properties), resulting in a high compression ratio.

Decompression

Figure 7:
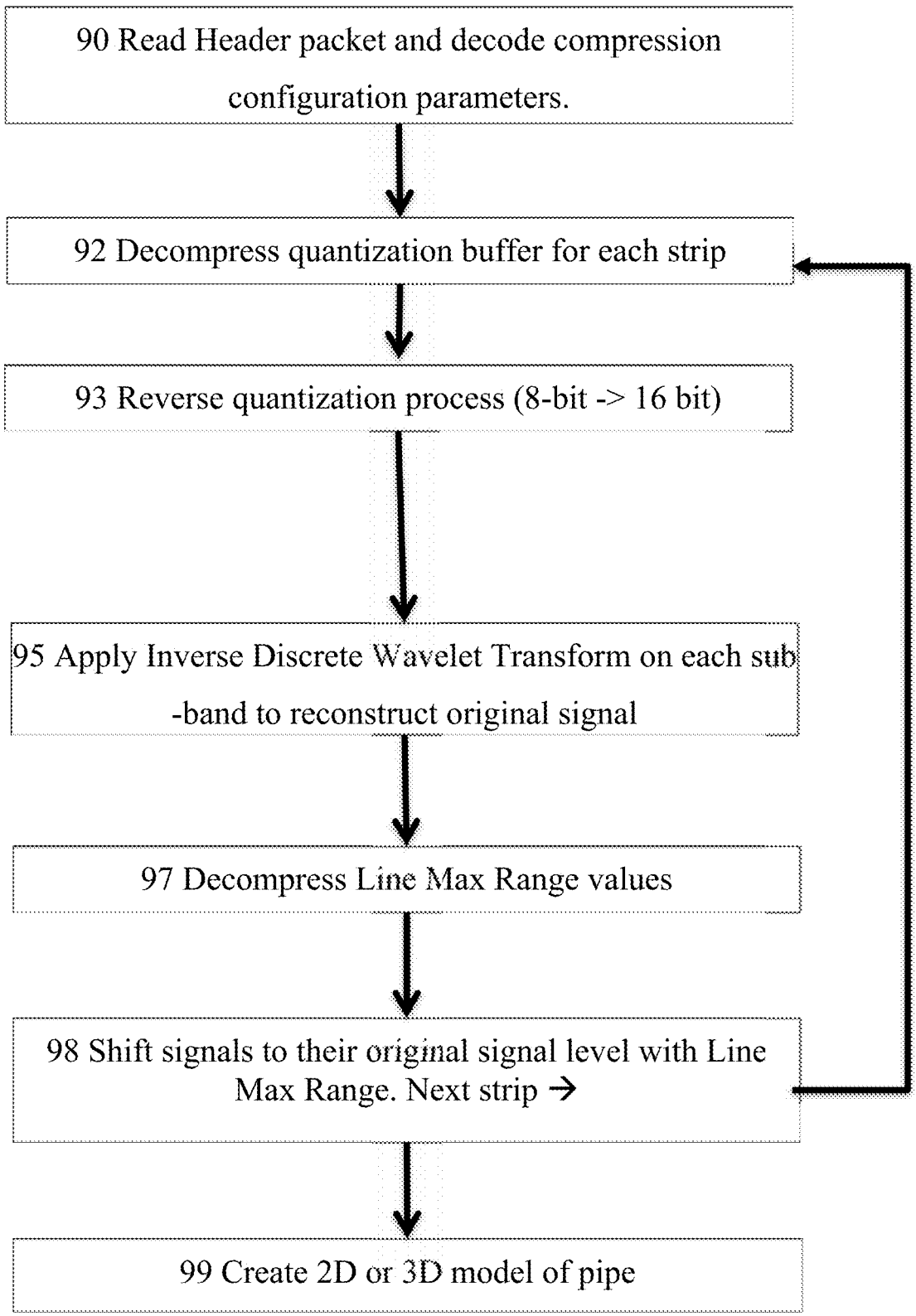
FIG. 7 is a workflow for decompressing an acoustic waveform.

FIG. 7 provides a flow chart for decompressing the packets of compressed data to a substantially restored reflection signal, largely by reversing each of the prior compression steps. This process is run by the Operations Computer or Remote computer, usually prior to image processing and visualization.

The packet may comprise a header of the compression parameters used, COMPRESSED WAVELET COEFFICIENTS for a plurality of scan lines, and a compressed list of Line Max Range values (step 90).

Each strip may comprise plural scan lines of COMPRESSED QUANTIZED WAVELET COEFFICIENTS, which are decompressed using a Lossless Compression Algorithm (Step 92) into QUANTIZED DATA. The QUANTIZED DATA are reverse quantized (e.g. from 8-bits to 16-bits) in Step 93 to DECOMPRESSED WAVELET COEFFICIENTS. This may be done using a µ-law decoder.

The processor applies an Inverse Discrete Wavelet Transform using a reversed Cascading Filter bank to the DECOMPRESSED WAVELET COEFFICIENTS using a wavelet such as the Inverse Haar, Inverse Daubechies, or other wavelet transforms, as determined by the compression configuration parameters. This occurs for each of the sub-bands identified in the header to return an UNSCALED RECONSTRUCTED SIGNAL.

Figure 9:
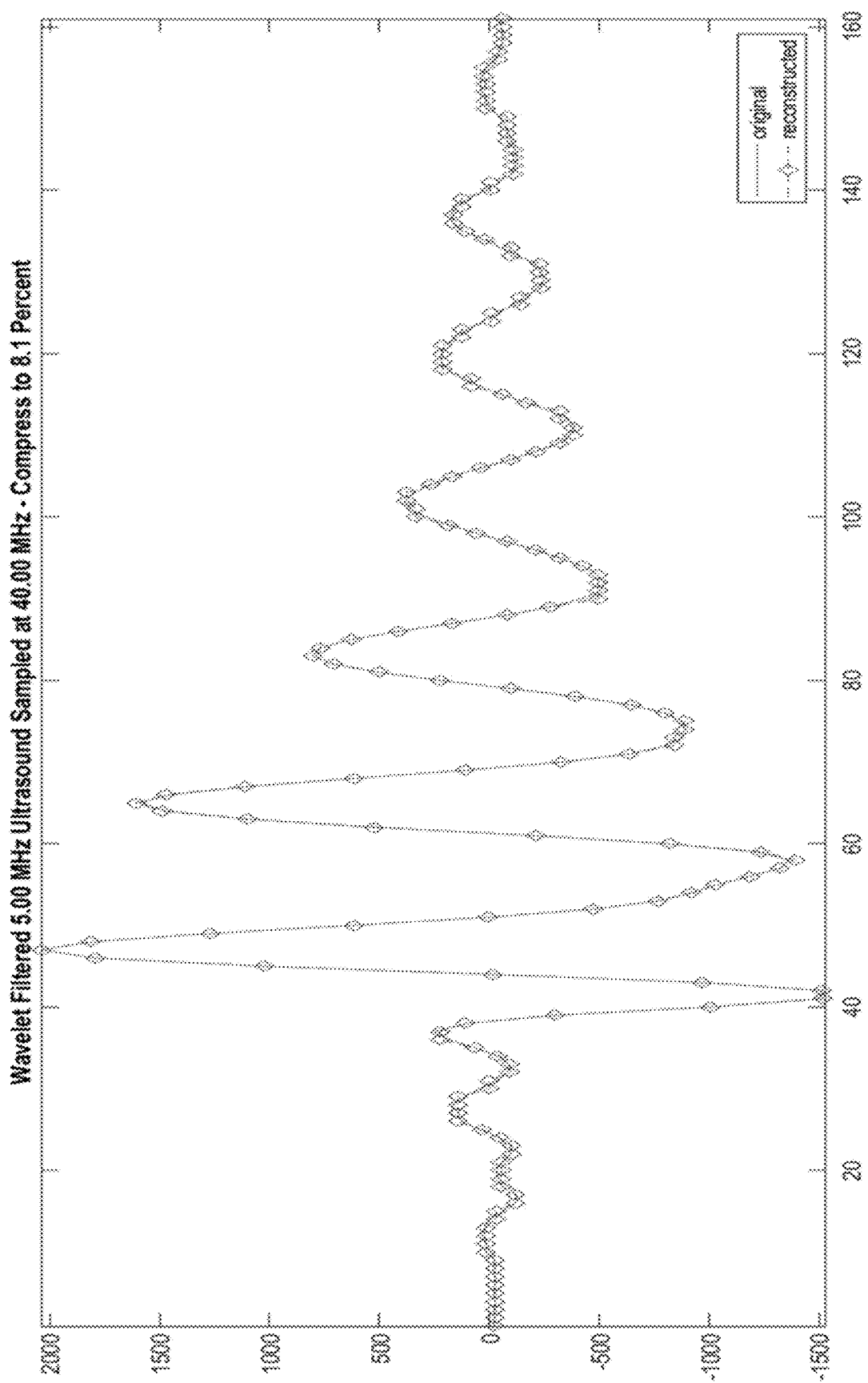
FIG. 9 is graph of original and reconstructed waveforms.

The Line Max Range values are decompressed to obtain the Line Max Range for each scan line (step 97). The Line Max Range is used to rescale the SCALED RECONSTRUCTED SIGNAL to its original signal levels (Step 98). FIG. 9 illustrates a reconstructed signal compared to the raw signal. Lossy aspects are: frequencies outside of the filter bank (which are unimportant for the well analysis); thresholded-out coefficients (which were too small to matter); and reduced precision from the quantization (after the calculations were made on the precise raw data).

These decompression steps are repeated for the remaining scan lines and strips in the packet, which repetition may be performed concurrently on multiple processors if desired.

The processor renders a model of the pipe or well from all the decompressed packets to be visualized on a display for a user (step 99). The model may be a 2D or 3D geometric representation.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A method of compressing ultrasound data received by a logging device having an ultrasound sensor, the method comprising:
   deploying the device into a well or pipe;
   receiving ultrasound data with the sensor;
   using a processor of the device, applying a forward wavelet transform to the ultrasound data to generate wavelet coefficients, wherein the wavelet coefficients include a plurality of sub-band coefficients, each corresponding to a frequency sub-band of a plurality of frequency sub-bands in the ultrasound data;
   using the processor of the device, applying a compression algorithm having a threshold algorithm to the wavelet coefficients to yield thresholded wavelet coefficients using dynamic threshold values, then encoding the thresholded wavelet coefficients to generate compressed wavelet coefficients;
   storing the compressed wavelet coefficients on a memory of the device; and
   transmitting the compressed wavelet coefficients to a remote computer after the device exits the well or pipe.

2. The method of claim 1, wherein the compression algorithm comprises quantizing the wavelet coefficients.

3. The method of claim 2, wherein the quantizing uses µ-Law companding.

4. The method of claim 3, wherein the encoding is based on a lossless encoding algorithm selected from the group consisting of: LZ77, LZ78, variants of LZ77 or LZ78, LZ1, LZ2, DEFLATE, LZ4, LZO, LZMA, Snappy, ZStandard, and Brotli.

5. The method of claim 1, wherein the method further comprises dynamically calculating the threshold values by:

determining a sub-band dynamic threshold value, of the dynamic threshold values, for each sub-band coefficient of the wavelet coefficients.

6. The method of claim 1, further comprising using the processor to calculate scale factors of the ultrasound data based on its dynamic range, scaling the ultrasound data prior to applying the forward wavelet transform and storing the calculated scale factors on the memory.

7. The method of claim 1, wherein the wavelet coefficients correspond to frequency sub-bands in a range 200 KHz to 10 MHz.

8. The method of claim 1, further comprising transferring the stored compressed wavelet coefficients to a computer system remote from the device and decompressing the wavelet coefficients to reconstruct the ultrasound data.

9. The method of claim 1, wherein the sensor comprises a plurality of transducer elements.

10. The method of claim 1, wherein the ultrasound data comprises a plurality of scan lines in a data frame and wherein the processor operates on a set of scan lines in a contiguous memory strip.

11. The method of claim 1, wherein the Wavelet Transform is a Haar Wavelet or Daubechies Wavelet.

12. A logging device comprising:
 a housing arranged to be deployed in a well or pipe;
 an ultrasound sensor for receiving ultrasound data;
 a processor; and
 one or more non-volatile memory units for storing compressed data and for storing instructions executable by the processor to:
  apply a forward wavelet transform to the ultrasound data to generate wavelet coefficients, wherein the wavelet coefficients include a plurality of sub-band coefficients, each corresponding to a frequency sub-band of a plurality of frequency sub-bands in the ultrasound data;
  apply a compression algorithm having a threshold algorithm to the wavelet coefficients to yield thresholded wavelet coefficients using dynamic threshold values, then encoding the thresholded wavelet coefficients to the wavelet coefficients to generate compressed wavelet coefficients; and
  store the compressed wavelet coefficients on the one or more non-volatile memory units.

13. The device of claim 12, wherein the compression algorithm comprises quantizing the wavelet coefficients.

14. The device of claim 13, wherein quantizing uses comprises $\mu$-Law companding.

15. The device of claim 14, wherein encoding uses a lossless encoding Algorithm selected from the group consisting of: LZ77, LZ78 and variants of LZ77 or LZ78 LZ1, LZ2, DEFLATE, LZ4, LZO, LZMA, Snappy, ZStandard, and Brotli.

16. The device of claim 12, wherein the instructions are further executable by the processor to dynamically calculate the threshold values by:
 determining a sub-band dynamic threshold value, of the dynamic threshold values, for each sub-band coefficient of the wavelet coefficients.

17. The device of claim 12, wherein the instructions are executable by the processor further to: calculate scale factors of the ultrasound data based on its dynamic range; scale the ultrasound data prior to applying the forward wavelet transform; and store the calculated scale factors on the one or more non-volatile memory units.

18. The device of claim 12, wherein the wavelet coefficients correspond to frequency sub-bands in the range 200 KHz to 10 MHz.

19. The device of claim 12, wherein the ultrasound sensor comprises a plurality of transducer elements for receiving a plurality of ultrasound scan lines in a data frame and wherein subsets of the ultrasound scan lines are written to contiguous memory strips for processing by the processor.

20. The device of claim 12, wherein the Wavelet Transform is a Haar Wavelet or Daubechies Wavelet.

21. The device of claim 12, wherein the dynamic threshold values are calculated based on a statistical distribution of the wavelet coefficients corresponding to a plurality of ultrasound scan lines in a data frame.

22. The method of claim 1, further comprising calculating the dynamic threshold values based on a statistical distribution of the wavelet coefficients corresponding to a plurality of ultrasound scan lines in a data frame.

* * * * *